US011920864B2

(12) United States Patent
Daw et al.

(10) Patent No.: US 11,920,864 B2
(45) Date of Patent: Mar. 5, 2024

(54) DRYER AND A METHOD FOR DRYING A LIQUID FEED INTO A POWDER

(71) Applicant: GEA Process Engineering A/S, Søborg (DK)

(72) Inventors: Zahé Daw, Søborg (DK); Poul-Erik Aagaard, Sporup (DK); Alexander William Lear, Surrey (GB)

(73) Assignee: GEA Process Engineering A/S (DK)

( * ) Notice: Subject to any disclaimer, the term of this patent is extended or adjusted under 35 U.S.C. 154(b) by 657 days.

(21) Appl. No.: 17/255,360

(22) PCT Filed: Jun. 28, 2018

(86) PCT No.: PCT/DK2018/050172
§ 371 (c)(1),
(2) Date: Dec. 22, 2020

(87) PCT Pub. No.: WO2020/001712
PCT Pub. Date: Jan. 2, 2020

(65) Prior Publication Data
US 2021/0262730 A1 Aug. 26, 2021

(51) Int. Cl.
*F26B 5/08* (2006.01)
*C02F 11/127* (2019.01)
*C02F 11/13* (2019.01)
*F26B 3/12* (2006.01)

(52) U.S. Cl.
CPC .............. *F26B 5/08* (2013.01); *C02F 11/127* (2013.01); *C02F 11/13* (2019.01); *F26B 3/12* (2013.01)

(58) Field of Classification Search
CPC ..... F26B 5/08; F26B 3/12; C02F 11/13; C02F 11/123
USPC .......................................... 34/328
See application file for complete search history.

(56) References Cited

U.S. PATENT DOCUMENTS

| | | | | | |
|---|---|---|---|---|---|
| 2,571,143 | A | * | 10/1951 | Leslie | C11B 1/108 34/169 |
| 3,580,193 | A | * | 5/1971 | Logan | F23G 5/30 110/221 |
| 4,316,331 | A | * | 2/1982 | Lindstrom | C10F 5/04 44/635 |
| 4,409,740 | A | * | 10/1983 | Sousek | C22B 7/02 34/79 |

(Continued)

FOREIGN PATENT DOCUMENTS

| | | | |
|---|---|---|---|
| CA | 2577671 | A1 * | 3/2016 |
| CN | 204619404 | U | 9/2015 |

(Continued)

*Primary Examiner* — Stephen M Gravini
(74) *Attorney, Agent, or Firm* — Condo Roccia Koptiw LLP

(57) ABSTRACT

A dryer for drying a liquid feed into a powder comprises a drying chamber defined by a chamber wall including a bottom wall portion; a feed inlet for receiving the liquid feed and dispersing particulate feed into the drying chamber; at least one air inlet for entering drying air into the drying chamber; and at least one drying chamber outlet for dried powder and/or spend drying air from the drying chamber. The feed inlet comprises a decanter centrifuge with an axis of rotation; a first axial end; a second axial end; and a solid phase outlet at the first axial end.

10 Claims, 4 Drawing Sheets

(56) References Cited

U.S. PATENT DOCUMENTS

| | | | | |
|---|---|---|---|---|
| 5,815,946 | A * | 10/1998 | Dean | F26B 5/005 |
| | | | | 44/574 |
| 6,092,301 | A * | 7/2000 | Komanowsky | F26B 5/048 |
| | | | | 34/265 |
| 7,908,764 | B1 * | 3/2011 | Estes | C10L 9/00 |
| | | | | 34/58 |
| 8,065,815 | B2 * | 11/2011 | Christy | F26B 25/225 |
| | | | | 34/497 |
| 9,169,147 | B2 * | 10/2015 | Christy | C02F 11/145 |
| 9,441,882 | B2 * | 9/2016 | Yoshikawa | F26B 17/12 |
| 9,883,693 | B1 * | 2/2018 | Cradic | F26B 3/347 |
| 2005/0050749 | A1 | 3/2005 | Hauch | |
| 2006/0042113 | A1 * | 3/2006 | Ekart | B29B 9/16 |
| | | | | 34/58 |
| 2017/0182502 | A1 | 6/2017 | Aagaard et al. | |
| 2021/0262730 | A1 * | 8/2021 | Daw | C02F 11/13 |

FOREIGN PATENT DOCUMENTS

| | | | | |
|---|---|---|---|---|
| CN | 112334727 A * | 2/2021 | | C02F 11/127 |
| DE | 3630920 C1 | 4/1988 | | |
| DE | 4315074 A1 | 11/1994 | | |
| DE | 10256674 A1 | 6/2004 | | |
| DE | 102013109003 A1 | 2/2015 | | |
| JP | 6048778 B2 * | 12/2016 | | B09B 3/00 |
| KR | 101265740 B1 * | 5/2023 | | |
| WO | 91/04776 A1 | 4/1991 | | |
| WO | WO-2006028778 A2 * | 3/2006 | | B29B 9/16 |
| WO | WO-2020001712 A1 * | 1/2020 | | C02F 11/127 |

\* cited by examiner

DRYER AND A METHOD FOR DRYING A LIQUID FEED INTO A POWDER

CROSS REFERENCE TO RELATED APPLICATIONS

This application is the National Stage Entry under 35 U.S.C. § 371 of Patent Cooperation Treaty Application No. PCT/DK2018/050172, filed Jun. 28, 2018, the contents of which are hereby incorporated by reference herein in their entireties.

BACKGROUND

Dryers are well known in the art, e.g. in the form of so-called spray dryers an example of which e.g. is found in WO9104776A1, incorporated herein by reference, that discloses a spray dryer comprising a drying chamber with a vertical axis; a cylindrical part; a conical part below the cylindrical part, the conical part providing a bottom wall portion; a liquid feed inlet with a rotary atomizing wheel in the upper part of the drying chamber; and with separate outlets for powder product and for spend drying air including fines, i.e. a fine fraction of the powder product, in the lower conical part of the drying chamber. In operation a liquid feed is dispersed in the drying chamber as minute droplets by means of the rotary atomizing wheel to be mixed with heated drying air at a temperature well above the evaporation point of the liquid of the liquid feed for the liquid to evaporate. Thus the temperature of the heated drying air may be 200° C. to 2.000° C. depending on the substance to be treated and the process wanted to take place in the spray dryer.

Other types of dryers are known e.g. a so-called ring dryer an example of which is shown in the accompanying FIG. 1, which shows a ring dryer with backmixing wherein a feed 101 is conditioned in a mixer 102, carried by a screw conveyor 103 to a disperser 104 and on to a venturi 105 where it is fed into a hot air stream from an air heater 106. The feed is blown from the venturi 105 through a drying column 107 and a ring duct 108 whereby it is dried. Particles, especially larger particles, that are not sufficiently dried, but still moist and heavy, are separated in a manifold 109 by centrifugal force and are returned to the disperser 104 to be recycled to the venturi 105 and the drying column 107, etc. The air stream and the dried material, that are not recycled by the manifold 109 is optionally fed into a pre-separator 110, a type of cyclone with a horizontal axis, where a part of the dried material is separated from the air stream to a second screw conveyor 111. The air stream is led to cyclones 112 where the rest of the dried material is separated as product and led by a third screw conveyor 113 to a product collection. The pre-separator is optional and if not used, the air stream would be led directly to the cyclones 112 from the manifold 109. Part of the product is recycled to the mixer 102 to be mixed to the feed 101 to facilitate conditioning of the feed before entering the drying column 107. Exhaust gas from the cyclones 112 is in part recycled to the air heater 106 and what is not recycled is bled-off through a bleed-off 114 to be substituted by fresh air 115 and possibly products of combustion of fuel fed to the air heater 106 to provide for heating the air.

Another known technology for drying or at least dewatering solid matter from a liquid feed is centrifuging by means of what is known as a decanter centrifuge or solid-jacket screw centrifuge.

A decanter centrifuge generally comprises a rotatable bowl with a cylindrical part and a conical part said bowl having a central axis of rotation; a conveyor screw in the bowl that during operation conveys material towards the conical part; a liquid feed inlet for letting a liquid feed into the bowl; a solid phase or heavy phase outlet at the narrow end of the conical part; and a liquid phase or light phase outlet at the opposite end of the bowl. During operation a liquid feed comprising a light, liquid phase and a heavy, solid phase is let into the bowl and spinning the bowl around the axis of rotation results in a separation of the light phase and the heavy phase by centrifugal forces. The heavy, solid phase is by means of the conveyor screw, that rotates slowly relative to the spinning bowl, transported to the narrow end of the conical part of the bowl to exit through the solid phase outlet which is positioned at a relatively small radial distance from the axis of rotation. The liquid phase flows to the liquid phase outlet.

US2017/0182502A1, incorporated herein by reference, discloses a decanter centrifuge in which the solid phase exiting from the solid phase outlet is provided in a discharge chamber which is open downwards. The discharge chamber is, according to paragraph 49 and 50 of US2017/0182502A1, designed in the manner of a housing which comprises axial walls, which comprise in the radial direction walls which are relatively far removed from the actual solid matter discharge openings, or solid phase outlet, such that solid matter to be discharged is initially able to fly relatively far radially from the drum, or bowl, which is rotating at high speed, in a curve outward until it impacts there, where applicable against the inside surface of the walls. By flying for a relatively long period until it comes up against the walls or until it drops down vertically, the solid matter is dried for a relatively long period in the air during its flight. Said effect is advantageously strengthened by a gas flow generator, in particular an air flow generator, for example a blower (preferably an air compressor), being provided, said blower being arranged and designed in such a manner that, for discharging the solid matter, it generates, inside the discharge chamber, a relatively strong gas flow, in particular an air flow, which supports the drying of the solid matter ejected from the drum. The air of the air flow may be cooled or heated to be tempered. By heating the temperature in the discharge chamber may be in excess of 40° C. or even in excess of 60° C.

Thus, exiting the decanter centrifuge according to US2017/0182502A1 part of the solid matter is discharged up-wards or horizontally outwards to impact the axial wall of the discharge chamber before it drops down vertically and part of the solid matter is discharged downwards to drop down immediately. Hereby, the solid matter that has been dewatered in the decanter centrifuge is partially dried before leaving the downwards open discharge chamber.

For some substances the drying provided for by the decanter centrifuge disclosed in US2017/0182502A1 suffices before further treatment or storage of the solid matter or solid phase. For other substances further drying is needed which may e.g. be carried out by means of a ring dryer as described above.

SUMMARY

The present invention relates to a dryer for drying a liquid feed into a powder, comprising a drying chamber defined by a chamber wall including a bottom wall portion; a liquid feed inlet for receiving the liquid feed and dispersing particulate feed into the drying chamber; at least one air inlet for entering drying air into the drying chamber; and at least one drying chamber outlet for dried powder and/or spend drying air from the drying chamber.

The invention further relates to a method of drying a liquid feed, including a liquid and a solid phase, into a powder using a dryer according to the present invention.

It is an object of the present invention to provide a dryer and a method of drying that provide for drying a liquid feed in to a powder in an effective manner.

This is obtained according to the invention by means of a dryer as mentioned by way of introduction in which the feed inlet comprises a decanter centrifuge having an axis of rotation; a first axial end; a second axial end; and a solid phase outlet at the first axial end. Thus, by combining in a surprising manner two different technologies, namely mechanical separation and proper drying technology, the present inventors have obtained an apparatus giving the possibility of simplifying the drying process and eliminating traditional multiple step dryers and backmixing of product. The new apparatus further gives new possibilities of controlling the drying process to improve product quality and provide for major energy savings.

It should be that herein the term "drying air" refers to any gas that is suitable for drying solid phase particles emerging from the solid phase outlet, including atmospheric air, possibly conditioned in relation to moisture content and temperature.

In an embodiment, the drying chamber has a common drying chamber outlet for dried powder and spend drying air, and a product conduit is connected to the common drying chamber outlet for pneumatic conveyance of the dried powder through the product conduit. Hereby is obtained that the entire amount of produced powder is transported in one stream from the drying chamber. The dried powder may comprise dried as well as semi-dried particles and drying of the particles may continue as long as the particles are suspended by the drying air, i.e. the drying of the particles may continue outside the drying chamber.

In a further practical embodiment, the product conduit is connected to a sep-*arator* for separating the dried powder and the spend drying air.

In an embodiment, the air inlet is configured to provide a swirl of drying air inside the drying chamber. Hereby an effective drying process in the drying chamber is facilitated.

In an embodiment, the axis of rotation of the decanter centrifuge is horizontal, and in a further embodiment the drying chamber generally has a disk-shape with a circumferential wall, a part of which constitutes the bottom wall portion, and the drying chamber has a tangential drying chamber outlet and preferably a tangential air inlet for entering at least part of the drying air. Hereby an effective capture of the solid material dispersed in the drying chamber by a stream of the drying air is obtained.

In further embodiment, the solid phase outlet of the decanter centrifuge is positioned centrally in the drying chamber.

In another embodiment, the axis of rotation of the decanter centrifuge is vertical.

In a further embodiment, the bottom wall portion of the drying chamber is conical, e.g. as it is known per se from spray dryers.

In a further embodiment, the first axial end of the decanter centrifuge is positioned below the second axial end of the decanter centrifuge, and in yet a further embodiment the decanter centrifuge is suspended at an upper end of the drying chamber for the solid phase outlet to extend inside the drying chamber. Hereby is obtained that the decanter centrifuge need not take up space inside the drying chamber.

In another embodiment the first axial end of the decanter centrifuge is positioned above the second axial end of the decanter centrifuge and in a further embodiment the decanter centrifuge is suspended inside the drying chamber.

The object is further obtained by a method of drying a liquid feed into a powder using a dryer according to the invention, including the steps of: separating a liquid feed into a solid phase and a liquid phase in the decanter centrifuge; dispersing the solid phase directly into the drying chamber from the solid phase outlet of the decanter centrifuge; letting drying air into the drying chamber to mix with the dispersed solid phase thereby drying the dispersed solid phase; and removing the dried solid phase from the drying chamber.

In an embodiment, the step of removing the dried solid phase from the drying chamber includes pneumatically conveying the dried solid phase by means of the drying air, and in a further embodiment the removed dried solid phase is conveyed to a separator for separation of the dried solid phase from the pneumatically conveying drying air.

BRIEF DESCRIPTION OF THE DRAWINGS

The invention will in the following be explained in further detail by way of non-limiting examples having reference to the accompanying schematic drawings, in which.

In the following different embodiments of a dryer according to the invention are described with reference to the drawings and similar features in the different embodiments are designated by similar reference numerals.

DETAILED DESCRIPTION

Figure 1:
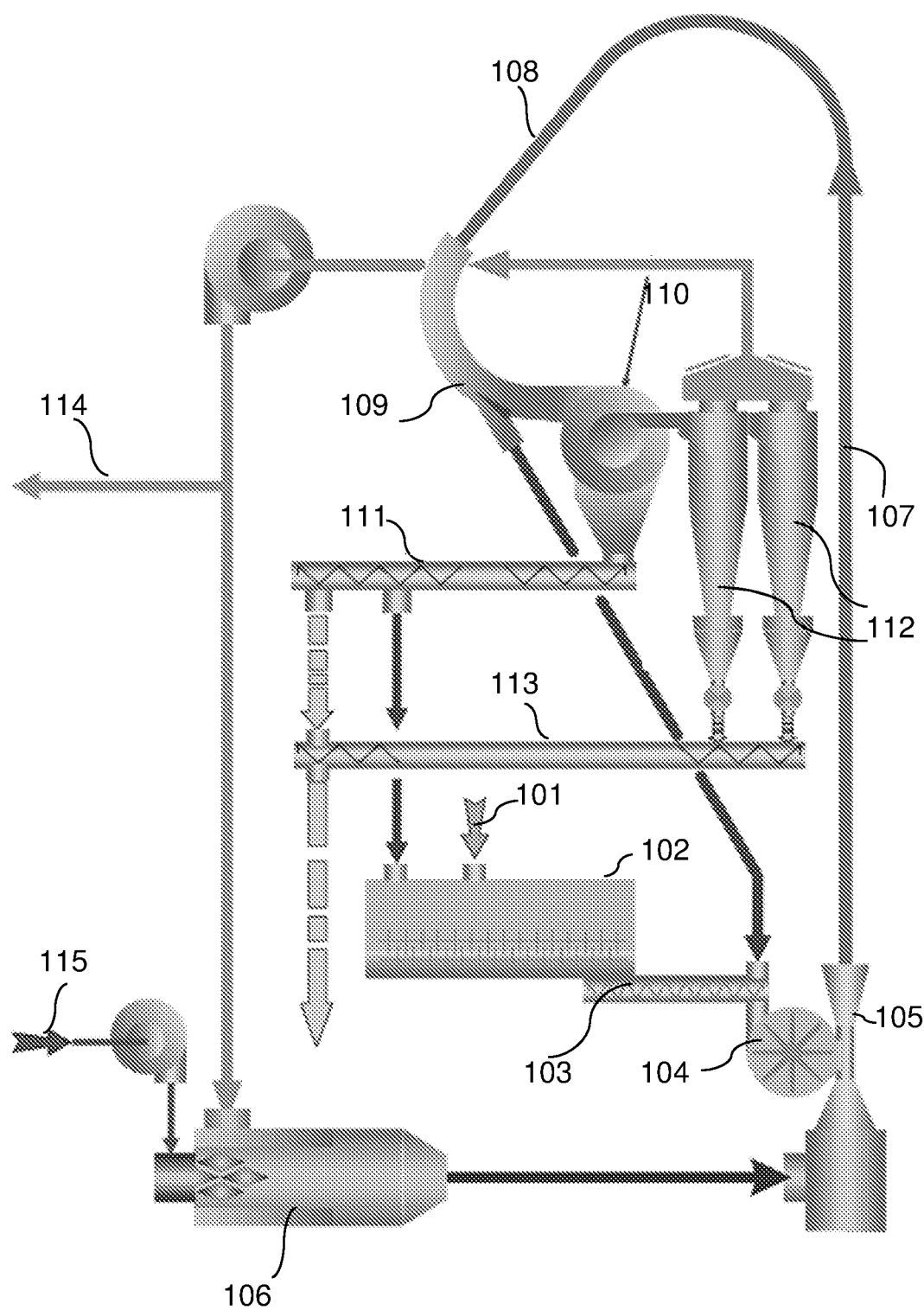
FIG. 1 shows a prior art ring dryer.
Figure 2:
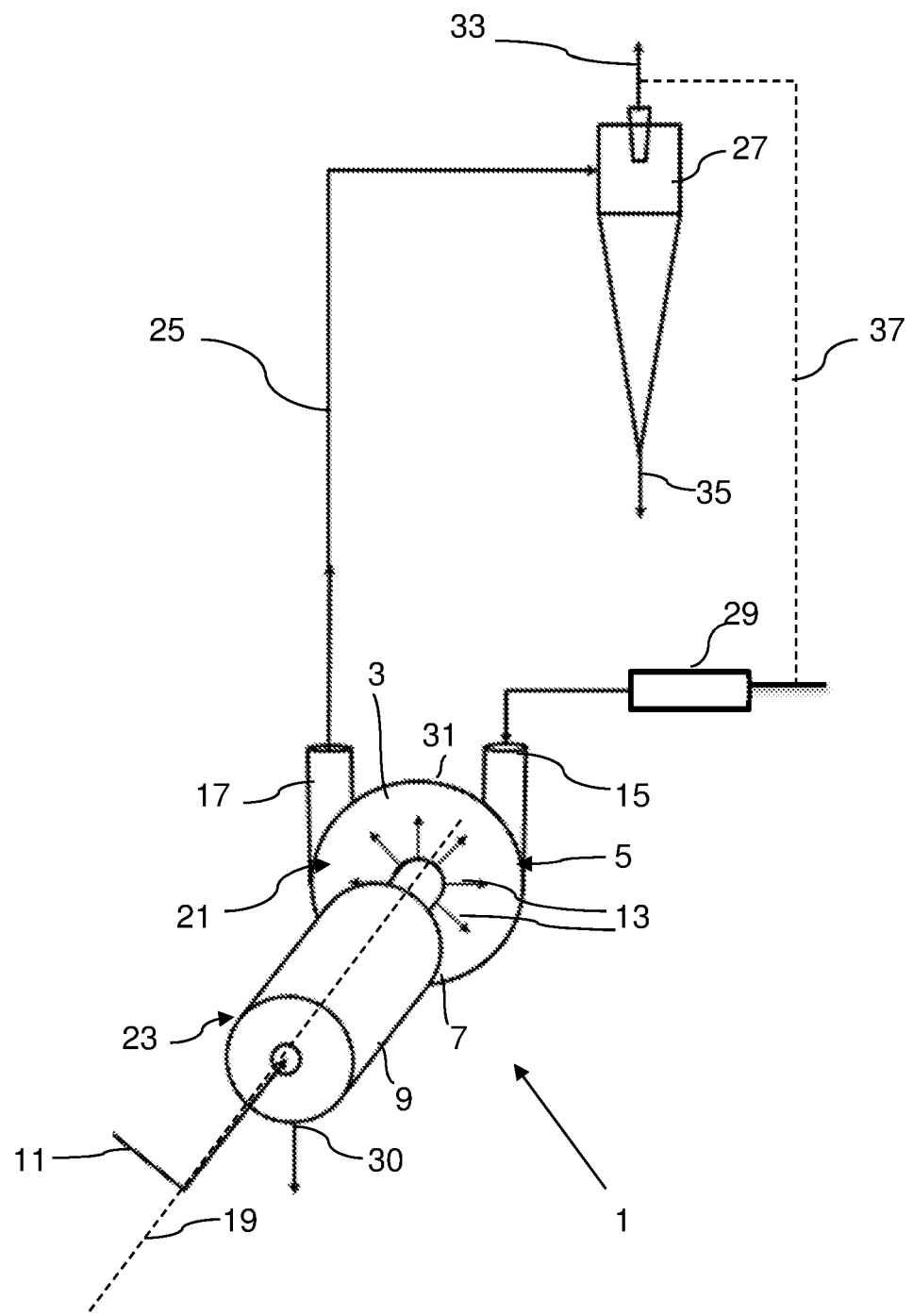
FIG. 2 shows a first embodiment of a dryer according to the invention comprising a decanter centrifuge with a horizontal axis of rotation.
Figure 3:
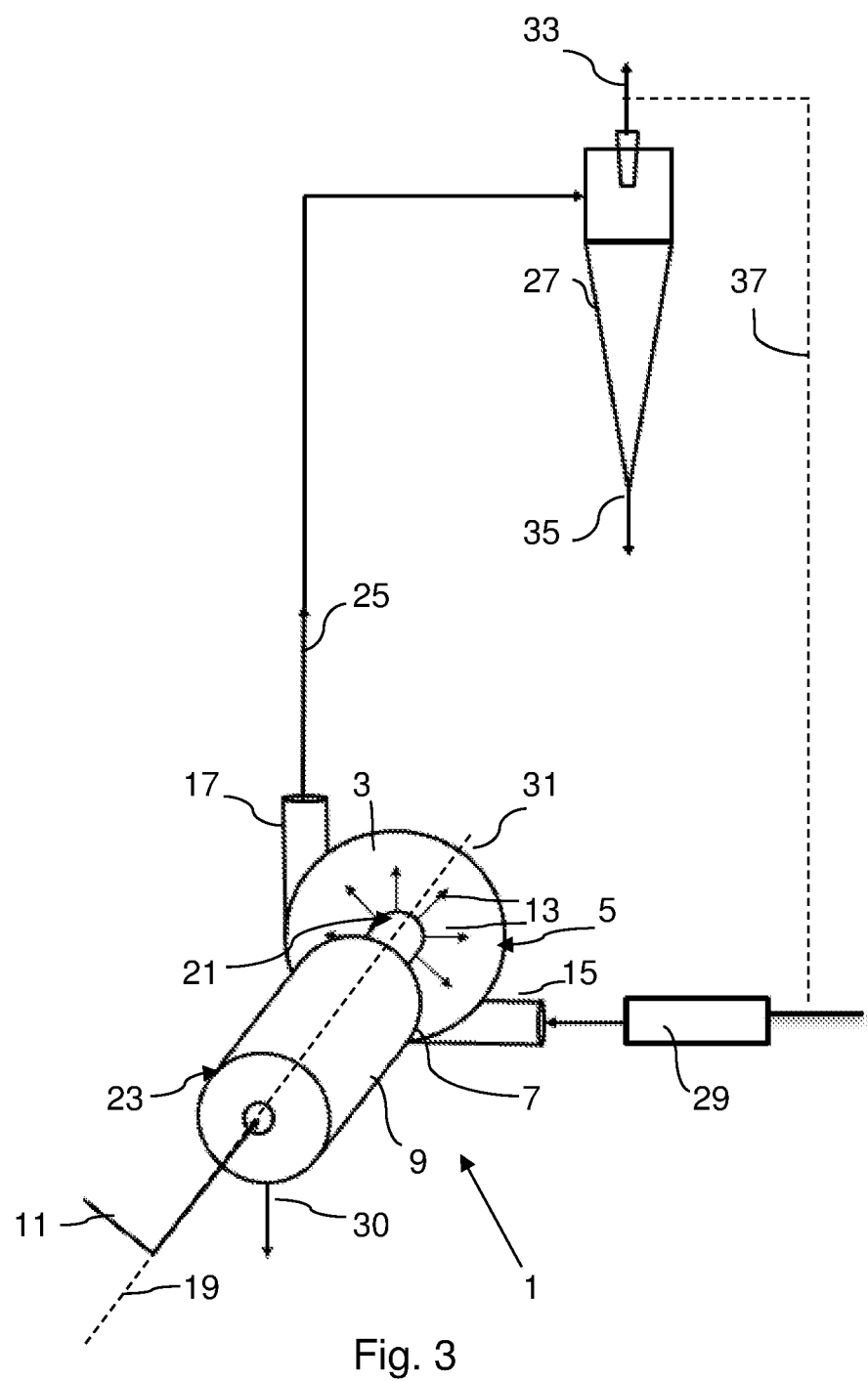
FIG. 3 shows a variant of the dryer shown in FIG. 2.

FIGS. 2 and 3 show, in two variants, a dryer 1 comprising a drying chamber 3 defined by a chamber wall 5, which includes a bottom wall portion 7; a liquid feed inlet in the form of a decanter centrifuge 9 for receiving a liquid feed 11 and dispersing dewatered, particulate feed 13 into the drying chamber 3; an air inlet 15 for entering drying air into the drying chamber; and a drying chamber outlet 17 for outletting in common dried powder and spend drying air from the drying chamber 3. The decanter centrifuge 9 has a horizontal axis of rotation 19 and for the sake of explanation it has a first axial end 21 and a second axial end 23. A solid phase outlet dispersing in operation the particulate feed 13 is at the first axial end 21.

A product conduit 25 is connected to the common drying chamber outlet 17 for pneumatic conveyance of the dried powder through the product conduit 25 to a separator, which in the present embodiment is a cyclone 27. The dried powder may comprise dried as well as semi-dried particles and drying of the particles may continue as long as the particles are suspended by the drying air, i.e. the drying of the particles may continue outside the drying chamber. Thus the drying process may continue in the product conduit 25 and in the cyclone 27 until the powder is eventually separated from the stream of drying air suspending and conveying the powder through the product conduit 25 and into the cyclone 27.

An air heater 29 is provided for heating the drying air up-stream of the air inlet 15.

Centrally at the second axial end 23 the decanter centrifuge 9 comprises an inlet for the liquid feed 11, and the decanter centrifuge 9 has a liquid phase outlet at the second axial end 23.

The drying chamber 3 is generally disk-shaped and co-axial with the decanter centrifuge 9 and the drying chamber 3 has a circular, circumferential wall 31, a part of which constitutes the bottom wall portion 7. The drying chamber 3 and the decanter centrifuge 9 being co-axial entails that the solid phase outlet of the decanter centrifuge 9 is positioned centrally in the drying chamber 3. The air inlet is connected tangential to the circumferential wall 31 to introduce drying air into the drying chamber in an angular direction relative to the axis of the drying chamber, and the drying chamber outlet 17 is correspondingly connected to the circumferential wall 31 to exit the dried powder and spend drying air from the drying chamber 3 in the same angular direction relative to the axis. Hereby is provided for the formation of a swirl of the air inside the drying chamber 3 which effectively promotes the drying of the particulate feed 13. Further, the configuration of the air inlet and the drying chamber outlet 17 facilitates pneumatic transport of the lot of dried powder out of the drying chamber 3.

The air inlet 15 and the drying chamber outlet 17 may be positioned axially askew, i.e. at slightly different axial positions thereby further promoting the swirl of air inside the drying chamber 3. Moreover, by positioning the air inlet 15 and the drying chamber outlet 17 axially askew the particles or powder suspended in the air inside the drying chamber may be forced to spirally circulate an extra 360° around the axis of rotation before leaving the drying chamber 3.

The cyclone 27 receives in operation spend drying air and dried powder from the drying chamber outlet 17. The cyclone 27 separates in a manner known per se the spend drying air 33 and the dried powder 35. The spend drying air 33 may in part be recirculated to the air heater 29 and the air inlet 15 as indicated by broken line 37, when the spend drying air 33 is far from saturated by vapour of the liquid of the liquid feed. By recirculating part of the spend drying air, which is still relatively hot compared to the air of the surroundings, energy for heating the drying air in the air heater 29 before entering through the air inlet 15 may be saved.

As indicated by comparison of FIG. 2 and FIG. 3 the air inlet 15 and the drying chamber outlet 17 may be positioned at different angular positions relative to the axis 19.

Figure 4:
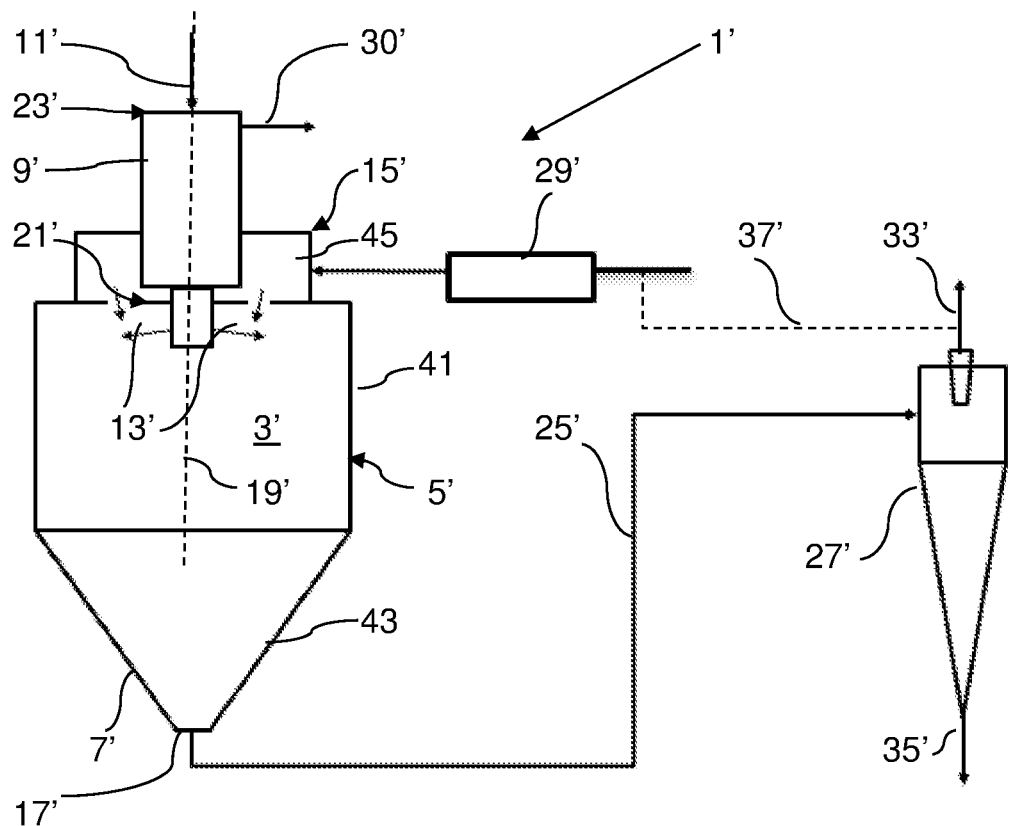
FIG. 4 shows a second embodiment of a dryer according to the invention comprising a decanter centrifuge with a vertical axis.
Figure 5:
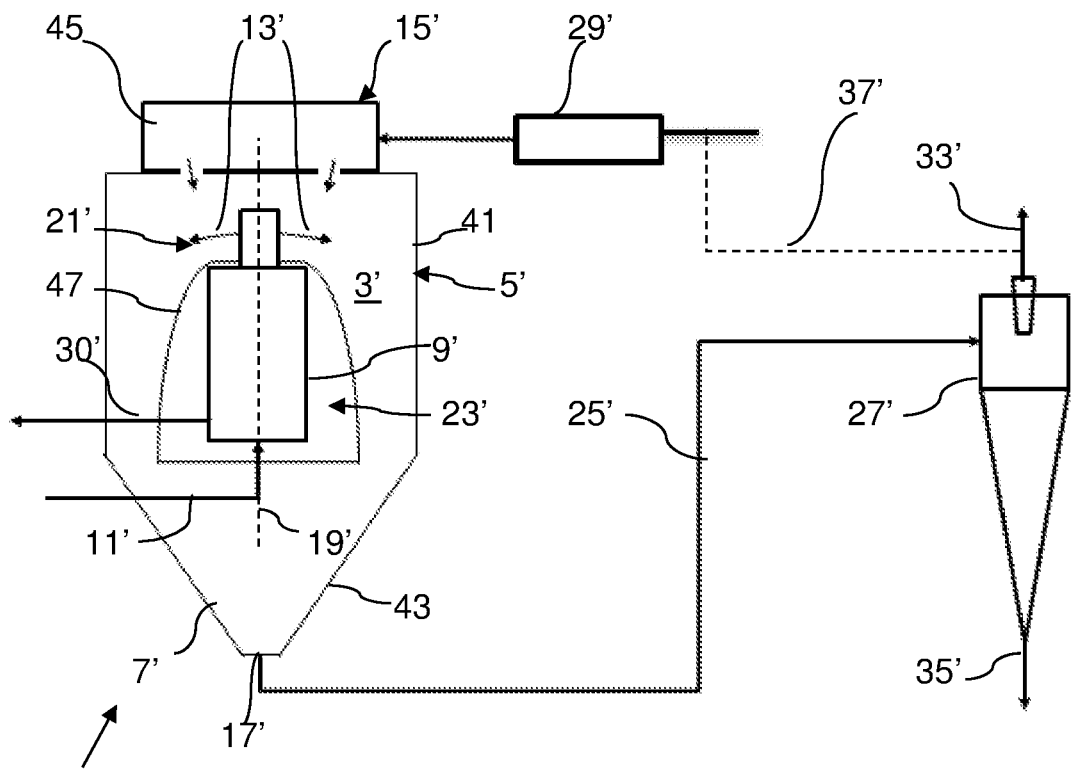
FIG. 5 shows a third embodiment of a dryer according to the invention comprising a decanter centrifuge with a vertical axis.

FIGS. 4 and 5 show two different embodiments of a dryer 1' according to the present invention in which a decanter centrifuge 9' is arranged for the axis of rotation 19' to be vertical. In both embodiments of FIGS. 4 and 5 a drying chamber 3' is generally formed like it is known per se from spray dryers, cf. the above mentioned WO9104776A1, and thus the drying chamber 3' of both embodiments comprise an upper cylindrical part 41 and a lower conical part 43 the latter providing a bottom wall portion 7' of the drying chamber 3'. At the top of the drying chamber 3' an air inlet 15' is comprising an air disperser 45, which in an embodiment is provided for even distribution of the drying air around the common axis 19' of the decanter centrifuge 9' and the drying chamber 3' and for providing a swirl of the in-flowing drying air and thus of the drying air inside the drying chamber 3'. In the embodiments shown an air heater 29' is provided up-stream of the air disperser 45. A common drying chamber outlet 17' is provided at the lower end of the conical part 43 and a product conduit 25' connects the drying chamber outlet 17' with a separator in the form of a cyclone 27'. In operation the cyclone 27' separates dried powder 35' and spend drying air 33, and provisions can be made for recycling a part of the spend drying air to the air heater 29' as indicated by a broken line 37', like in the embodiment shown in FIGS. 2 and 3.

In the embodiment shown in FIG. 4 the decanter centrifuge 9' is suspended at the upper end of the drying chamber 3' with the solid phase outlet provided at a first axial end 21' of the decanter centrifuge 9' extending into the drying chamber 3' for the decanter centrifuge 9' to disperse, from the solid phase outlet, particulate feed 13' into the drying chamber 3', a second axial end 23' comprising a liquid phase outlet 30' of the decanter centrifuge 9' being positioned above the first axial end 21'. Centrally at the second axial end 23' the decanter centrifuge 9' comprises an inlet for liquid feed 11'.

In the embodiment shown in FIG. 5 the decanter centrifuge 9' is provided inside the drying chamber 3' and has its first axial end 21' with the solid phase outlet positioned above the second axial end 23' with the inlet for liquid feed 11' and the liquid phase outlet 30'. In this embodiment a partition 47 may be provided to provide a hollow chamber inside the drying chamber 3' for accommodating the main part of the decanter centrifuge 9' to avoid that it is heated by hot air in the drying chamber 3'.

For all of the above embodiments of the dryer 1, 1' the following continuous process may be conducted using the dryer 1, 1'.

A liquid feed 11, 11' is entered into the decanter centrifuge 9, 9' whereby a solid phase of the liquid feed is separated from a liquid phase of the liquid feed, said liquid phase leaving the decanter centrifuge 9, 9' through the liquid phase outlet 30, 30'. The solid phase is dispersed from the solid phase outlet of the decanter centrifuge 9, 9' and since the bowl of the decanter centrifuge 9, 9' including the solid phase outlet, as well known to the skilled person, is spinning fast around the axis 19, 19' the solid phase is ejected as a particulate feed 13, 13' comprising small particles of solid phase.

The particulate feed 13, 13' is thus dispersed into the drying chamber 3, 3' and into a swirl of hot air in the drying chamber 3, 3', said hot air being introduced through the air inlet 15, 15' after being heated to a predetermined temperature in the air heater 29, 29'. By the encounter with the hot air in the drying chamber 3, 3' the particulate feed 13, 13' is dried into dried powder, which by pneumatic transport is carried through the drying chamber outlet 17, 17' by the now spend drying air, through the product conduit 25, 25' and into the cyclone 27, 27' where the dried powder 35, 35' is separated from the spend drying air 33, 33' to be let out through respective outlets as indicated in the figures and as recognised by the skilled person.

The dried powder 35, 35' may be collected as product of the process.

Thus the apparatus, or dryer, and the method, or process, described above may be utilised for providing a powder product of most different materials by adjusting process parameters, such as temperature, etc. in accordance with the nature and character of the liquid feed and its solid and liquid phases. Using a decanter centrifuge as feed inlet for a drying process energy for evaporation of a large part of the liquid phase of the liquid feed may be saved. Moreover, using a decanter centrifuge as feed inlet for a drying process thus letting the solid phase outlet of the decanter centrifuge directly into the drying chamber a very gentle treatment of solid particles may be obtained that may give improved product quality compared to traditional drying processes.

Though the invention has herein ben described with reference to specific embodiments it should be understood that the scope of the invention is not limited to said embodiments.

The invention claimed is:

1. A dryer for drying a liquid feed into a powder, comprising:
    a drying chamber defined by a chamber wall including a bottom wall portion;
    a feed inlet for receiving the liquid feed and dispersing particulate feed into the drying chamber;
    at least one air inlet for entering drying air into the drying chamber; and
    at least one drying chamber outlet for dried powder and/or spent drying air from the drying chamber,
    wherein the feed inlet comprises a decanter centrifuge having:
    an axis of rotation;
    a first axial end;
    a second axial end; and
    a solid phase outlet at the first axial end;
    wherein the axis of rotation of the decanter centrifuge is vertical; and
    wherein the first axial end of the decanter centrifuge is positioned below the second axial end of the decanter centrifuge.

2. The dryer of claim 1, wherein the drying chamber has a common drying chamber outlet for dried powder and spent drying air, and a product conduit is connected to the common drying chamber outlet for pneumatic conveyance of the dried powder through the product conduit.

3. The dryer of claim 2, wherein the product conduit is connected to a separator for separating the dried powder and the spent drying air.

4. The dryer of claim 1, wherein the air inlet is configured to provide a swirl of drying air inside the drying chamber.

5. The dryer of claim 1, wherein the bottom wall portion of the drying chamber is conical.

6. The dryer of claim 1, wherein the decanter centrifuge comprises a rotatable bowl with a cylindrical part and a conical part, the rotatable bowl having:
    a central axis of rotation;
    a conveyor screw in the bowl that conveys material towards the conical part; a liquid feed inlet for letting a liquid feed into the bowl;
    a solid phase or heavy phase outlet at the narrow end of the conical part; and
    a liquid phase or light phase outlet at the opposite end of the bowl.

7. The dryer of claim 1, wherein the decanter centrifuge is suspended at an upper end of the drying chamber for the solid phase outlet to extend inside the drying chamber.

8. A method of drying a liquid feed into a powder using a dryer according to claim 1, the method comprising:
    separating a liquid feed into a solid phase and a liquid phase in the decanter centrifuge;
    dispersing the solid phase directly into the drying chamber from the solid phase outlet of the decanter centrifuge;
    letting drying air into the drying chamber to mix with the dispersed solid phase thereby drying the dispersed solid phase; and
    removing the dried solid phase from the drying chamber.

9. A method according to claim 8, wherein removing the dried solid phase from the drying chamber includes pneumatically conveying the dried solid phase by means of the drying air.

10. A method according to claim 9, wherein the removed dried solid phase is conveyed to a separator for separation of the dried solid phase from the pneumatically conveying drying air.

* * * * *